US009003471B2

(12) United States Patent
Van Noetsele

(10) Patent No.: US 9,003,471 B2
(45) Date of Patent: Apr. 7, 2015

(54) RESPONSE TIMING

(75) Inventor: Robert Van Noetsele, Middelbeers (NL)

(73) Assignee: UPC Broadband Operations B.V., Schiphol-Rijk (NL)

( * ) Notice: Subject to any disclaimer, the term of this patent is extended or adjusted under 35 U.S.C. 154(b) by 2505 days.

(21) Appl. No.: 10/383,925

(22) Filed: Mar. 7, 2003

(65) Prior Publication Data

US 2004/0006773 A1   Jan. 8, 2004

(30) Foreign Application Priority Data

Mar. 7, 2002   (GB) .................................. 0205405.4

(51) Int. Cl.
H04N 7/173 (2011.01)
H04N 5/445 (2011.01)
H04N 7/16 (2011.01)

(52) U.S. Cl.
CPC ..................................... *H04N 7/163* (2013.01)

(58) Field of Classification Search
USPC ............ 370/395.62; 463/40, 42; 725/24, 132, 725/136, 139, 151, 61
See application file for complete search history.

(56) References Cited

U.S. PATENT DOCUMENTS

| 5,537,143 A * | 7/1996 | Steingold et al. ............. 725/119 |
| 5,695,400 A * | 12/1997 | Fennell et al. .................. 463/42 |
| 5,764,275 A * | 6/1998 | Lappington et al. .......... 725/136 |
| 5,850,447 A * | 12/1998 | Peyret .............................. 463/29 |
| 6,135,777 A * | 10/2000 | Vogel .............................. 434/350 |
| 6,778,537 B1 * | 8/2004 | Ishibashi .................. 370/395.62 |
| 6,798,790 B1 * | 9/2004 | Enssle et al. .................. 370/503 |
| 7,073,190 B1 * | 7/2006 | Malaure et al. ................. 725/61 |
| 7,174,560 B1 * | 2/2007 | Crinon ............................. 725/60 |
| 2001/0003099 A1 | 6/2001 | Von Kohorn .................... 463/40 |
| 2002/0100064 A1 * | 7/2002 | Ward et al. ..................... 725/144 |
| 2002/0142842 A1 * | 10/2002 | Easley et al. .................... 463/42 |
| 2007/0250846 A1 * | 10/2007 | Swix et al. ...................... 725/10 |

FOREIGN PATENT DOCUMENTS

| EP | 1005885 A1 * | 6/2000 | ............. A63F 13/10 |
| WO | WO-90/04439 A1 | 5/1990 | |

OTHER PUBLICATIONS

ETSI; "Digital Video Broadcasting (DVB); Implementation Guidelines for DVB Terrestrial Services; Transmission Aspects"; TR101190 V1.1.1 (Dec. 1997); XP-002207123.

* cited by examiner

*Primary Examiner* — Rong Le
(74) *Attorney, Agent, or Firm* — Harrington & Smith

(57) ABSTRACT

A method for transmitting a message in an interactive television system, comprises receiving at a receiver unit a video stream including video data and a timing stream indicative of the timing of the video data; receiving at the receiver unit an instruction from a user to transmit a message from the receiver unit and in response to the instruction forming the message so as to include a timing indication based on current data from the timing stream; and transmitting the message from the receiver unit.

42 Claims, 4 Drawing Sheets

-- Prior Art --

RESPONSE TIMING

This invention relates to interactive television applications, and in particular to improving the timing resolution in interactive television applications.

A typical interactive television system is shown in FIG. 1 of the attached set of drawings. The system includes a digital video data provider 1, decoders 3a-c for converting the digital video data to an analogue format, a television 5 at each decoder for displaying the video data, and enhanced content transmitted over a network 2. In current systems, the enhanced content is transmitted to decoders, or set-top boxes (STBs), which then display pages of enhanced content on a television. A user input device 4 is provided at each decoder 3a-c so that a user can adjust settings of the decoder and/or the television 5 and respond to queries or questions in the enhanced content. The user input device 4 could, for example, be a keypad or remote control.

The term enhanced content is used herein to refer to content available to be played out at the request of a user onto a television screen. The enhanced content could be in addition to the basic video data of a television programme or movie. It may consist of information, such as news, television schedules, or weather reports, or may invite a response from a user.

Enhanced content may be transmitted over a network independently of video data, or alternatively may be embedded in the video data.

The term "interactive television" suggests that a viewer can provide input to the system, for example to respond to queries within the enhanced content or to control the video stream that he receives. An example of a user input/response is an answer to a question posed in the enhanced content (or interactive content). If the video content being displayed on a television is, for example, a quiz show, it may be desirable to provide interactive content consisting of quiz questions corresponding to those being asked in the quiz show.

It can be envisaged that an aspect of a quiz application on which entrants may be judged may be the speed with which the entrants, each using a set-top box, respond to questions posed. In this case, an arrangement would be required which could measure the relative times taken by each participating user in answering the questions.

In situations where the response time of a user to a page of enhanced content is significant, current set-top boxes, if they include date and time query functions, can provide information to within only seconds, or, at best, milliseconds. In the above example of a quiz show, the resolution of the timing information available would be unacceptable. If hundreds of thousands of users are participating in a particular quiz, for example, and all answers are received within 10 seconds, then millisecond accuracy would not be sufficient to determine the fastest response. It is conceivable that several millions of users may participate in a given contest. Many applications can be envisaged which would require more accurate timing information than is currently achievable.

A further problem associated with the timing aspect of interactive TV relates to the different broadcast delays corresponding to different broadcast media such as cable, satellite and terrestrial. A video signal transmitted by satellite, for example, would take longer to reach an STB than the same signal transmitted terrestrially. Thus it is preferably not the absolute time at which an STB user responds to a page of interactive television (iTV) that is relevant to judging the speed of responses: the significant time is rather the time between the STB receiving the iTV page, or at least the page being displayed, and the user responding. A system is desirable in which this relative time could be calculated and returned to the network to allow the speed of the response to be judged.

According to one aspect of the present invention there is provided a method for transmitting a message in an interactive television system, comprising receiving at a receiver unit a video stream including video data and a timing stream indicative of the timing of the video data; receiving at the receiver unit an instruction from a user to transmit a message from the receiver unit and in response to the instruction forming the message so as to include a timing indication based on current data from the timing stream; and transmitting the message from the receiver unit.

According to a second aspect of the invention there is provided a receiver unit for use in an interactive television system, the receiver unit comprising a receiver arrangement for receiving a video stream including video data and a timing stream indicative of the timing of the video data; a receiver arrangement for receiving an instruction from a user to transmit a message from the receiver unit; a message former for forming the message in response to the instruction, the message including a timing indication based on current data from the timing stream; and a transmission arrangement for transmitting the message from the receiver unit.

According to another aspect of the present invention there is provided a system for use in an interactive network, the system comprising: a video transmitter for transmitting a video stream including video data and a timing stream indicative of the timing of the video data; a plurality of receiver units for receiving the video stream and transmitting messages; and an analyser unit for analysing the messages transmitted by the receiver units.

According to yet another aspect of the invention there is provided a method of performing an interactive quiz show, the method comprising: transmitting to a receiver unit an invitation to a user to answer a question by sending a message; receiving a plurality of messages; identifying a winner as the user having answered the question correctly in the fastest time; and providing the winner with a prize.

Suitably the current data from the timing stream will indicate: 1) the current point in the video stream at the time when the question, to which the user is responding, is decoded at the receiver unit; and 2) the current point in the video stream at the time when an instruction to respond is sent to the receiver unit by the user. Alternatively, 1) could be the current point in the video stream at the time when the question, to which the user is responding, is transmitted from the receiver unit for display at a display unit, or the current point in the video stream at the time when the question, to which the user is responding, is received at the receiver unit.

Suitably, the timing indication could be a difference between the times 2) and 1) listed above, thus representing the time taken by the user in responding to the question.

Suitably the video data is MPEG data.

Preferably the timing stream has a resolution of at least 0.1 ms, corresponding to a frequency greater than 10 kHz. More preferably it has a resolution of at least 0.001 ms, corresponding to a frequency greater than 10 MHz. The timing stream is preferably a video timing stream. The timing stream is preferably associated with video frame information. The timing stream is suitably an MPEG Program Clock Reference with a frequency of 27 MHz.

An algorithm could be applied to interpolate cycles of the timing stream, thereby achieving a higher resolution than is available without interpolation.

Preferably the video data can be outputted from a receiver unit for display on a display unit, which would suitably be a television, and the receiver unit would suitably be a set-top box.

The message could suitably be formed by an enhanced television application in the receiver unit, and would preferably include data identifying the receiver unit from which it was transmitted or the user of that receiver unit. The message would also preferably include data relating to the response of the user.

The video stream would preferably include enhanced content, and a suitable application of the method or apparatus would be in a quiz program. The video stream would preferably include an image inviting the user to respond. The timing indication could suitably be produced by starting a timer when the image is decoded at the receiver unit, or by storing data from the timing stream when the image is decoded at the receiver unit, then calculating a difference between the time of transmission of a message and the stored time. The message would suitably be transmitted to a server via a network connected to the receiver unit.

The system for use in an interactive television network preferably comprises an analyser unit. After the transmission from a receiver unit to the network of a response message, the message would preferably be received at an analyser unit. The analyser unit could suitably carry out an analysis of the response message sent from a receiver unit. The analysis could suitably include determining whether a correct answer to a question, presented in video data or enhanced content, has been provided by a user, and determining the time taken by the user to respond to the question.

The analyser unit could suitably receive and analyse many response messages sent from many different receiver units. Preferably the analyser unit could perform a comparison between the response messages. Suitably the system could comprise many analyser units, each capable of receiving and analysing many response messages, connected in such a way that an overall comparison may be performed between all response messages received at all analyser units, in order to determine a winner of a competition. The winner may, for example, be defined as the user whose response message has a timing indication corresponding to the quickest response, and whose message contains the correct answer to a question.

Suitably, the analyser unit, or combination of analyser units, having determined the winner of a competition, could provide a prize to the winner, or transmit a message notifying the winner that he is entitled to a prize.

As well as quiz shows, the invention is also suited to applications such as subscriber enquiries, interactive games and subscriber voting in response to television events.

The invention will now be described by way of example with reference to the accompanying drawings, in which like reference numerals refer to like components.

Figure 1:
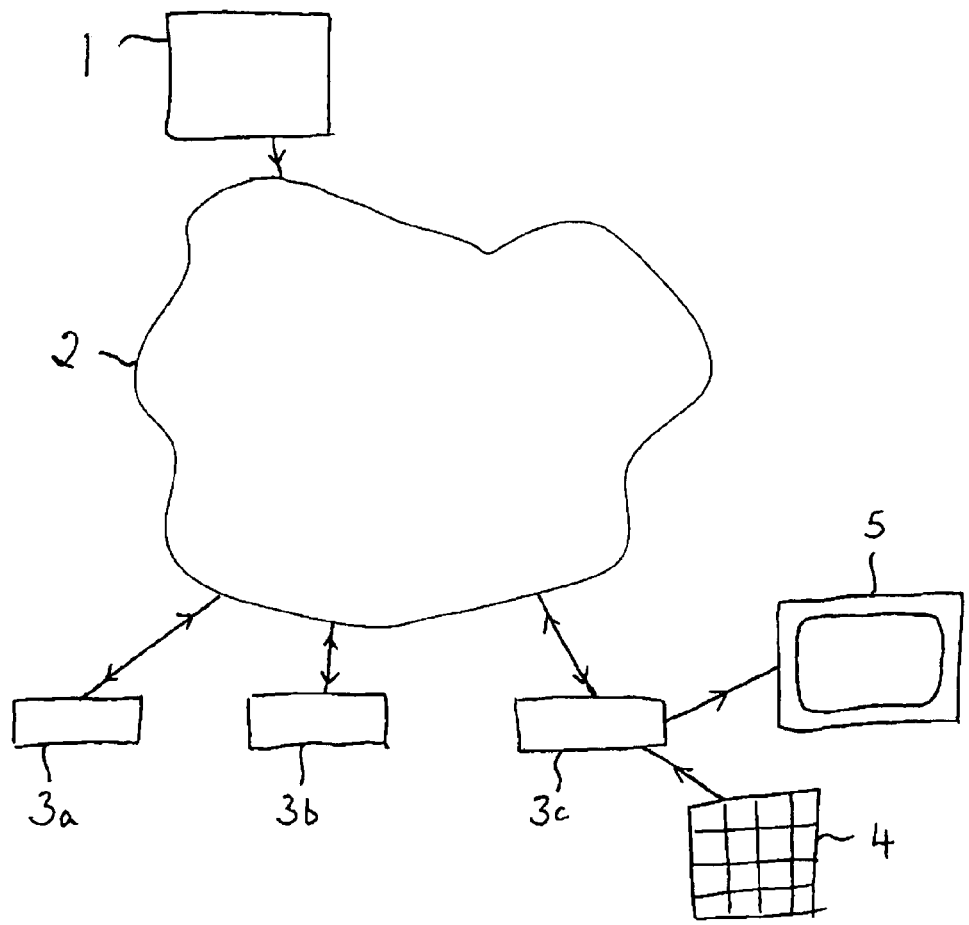
FIG. 1 shows a typical prior art interactive television system.
Figure 2:
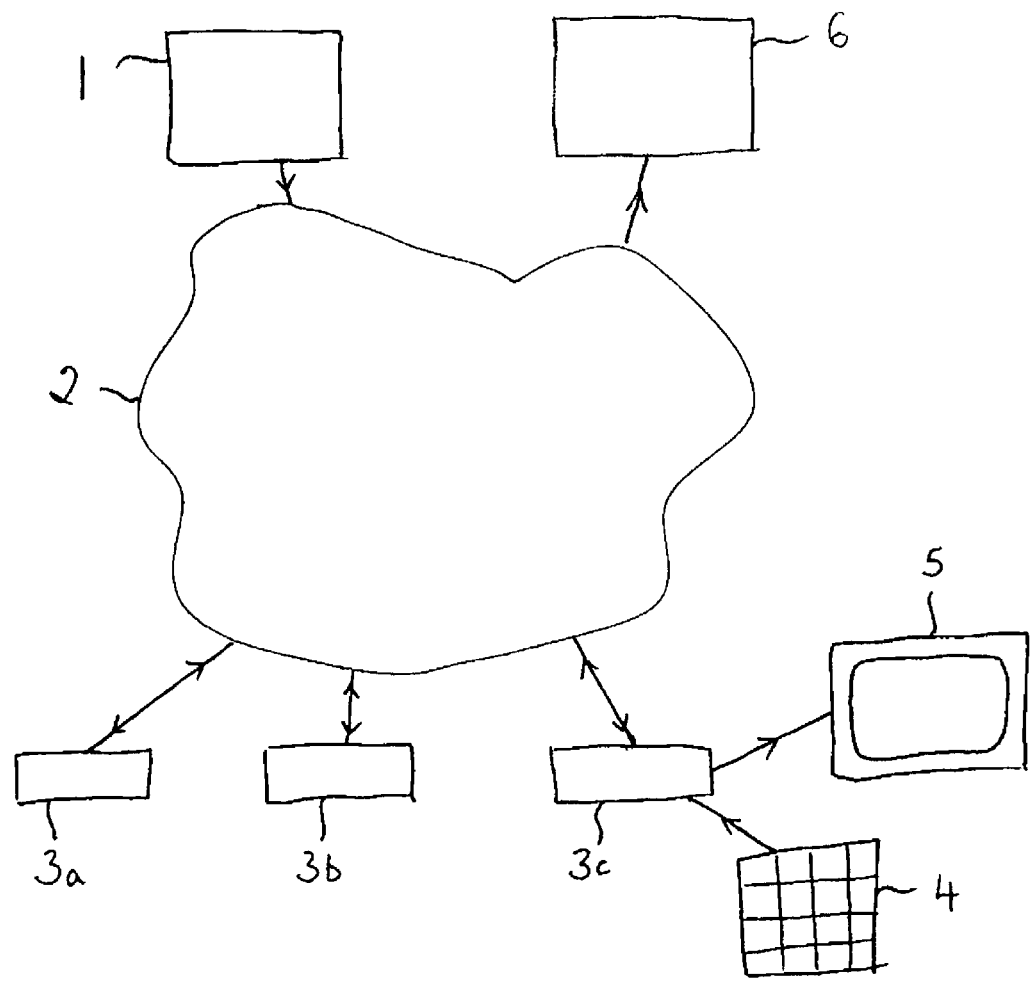
FIG. 2 shows an interactive television system.

In the system of FIG. 2, a video data provider 1 transmits video data to a network 2. This video data, containing a video signal and enhanced content, is then transmitted to a series of receiver units 3a-c which can decode the data, and transmit the decoded video signal and enhanced content to a display unit 5 for displaying to a viewer. The receiver units could, for example, be set-top boxes. The arrangement of receiver unit 3c is shown in more detail.

A user input device 4 is provided so that a user can adjust settings of the receiver unit 3 and/or the display unit 5 and respond to queries or questions in the enhanced content. The user input device could, for example, be a keypad or a remote controller.

An analysing unit 6, which is also connected to the network 2, is provided for receiving and analysing data transmitted by the receiver units 3a-c to the network 2. The network 2 could, for example, be a cable TV network, or the Internet. The network 2 could be provided by a set of sub-networks: for instance the video data could be transmitted by a wireless broadcast system to the receiver units, and data transmitted from the receiver units (e.g. to the analyser unit 6) could be carried by a terrestrial or wireless phone network.

Figure 3:
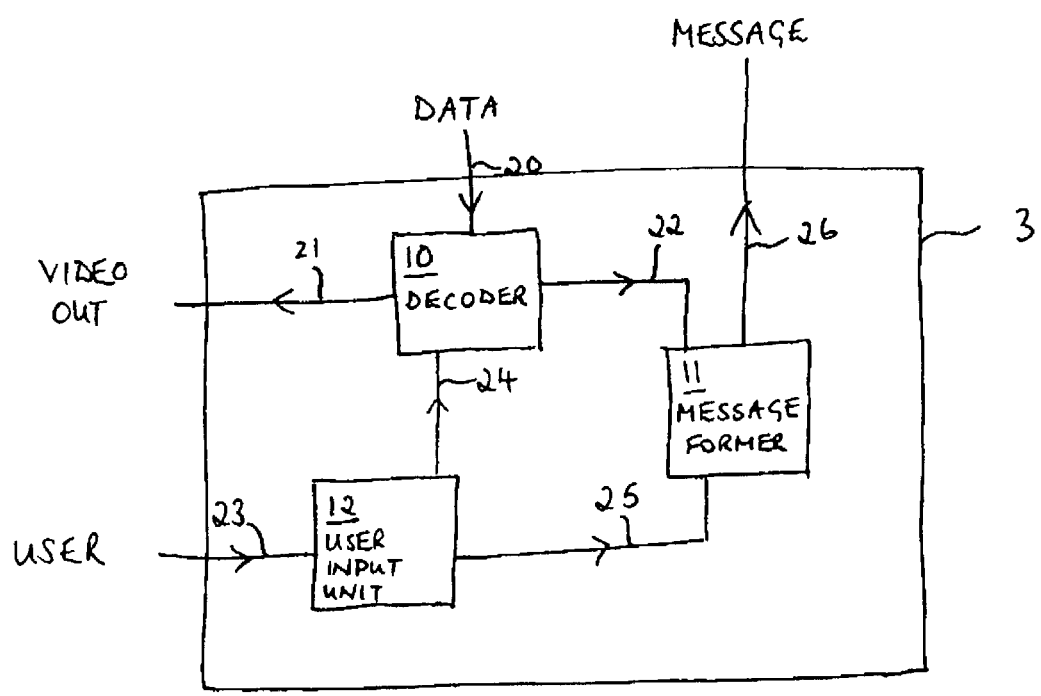
FIG. 3 shows a receiver unit for use in an interactive television system.

Referring now to FIG. 3, the receiver unit 3 of FIG. 2 will be described. Video data 20 from the network 2 is received by the receiver unit 3 and enters a decoder unit 10 which decodes the video signal 20. The enhanced content included in the video data will also be decoded, either in decoder 10 or in a separate decoder (not shown). The decoded video signal 21 is then outputted from decoder 10 and transmitted to a display unit 5. The decoded enhanced content 21 is also transmitted to the display unit 5, and timing data 22 from the enhanced content is fed to a message former 11. Input 23 from a user enters the receiver unit at user input unit 12. The user input 23 may include a command for altering settings of the receiver unit 3 (such as the channel to be displayed or the volume), a command relating to the enhanced content (such as a command to display a programme schedule for a particular channel) or a response to a question presented in the enhanced content.

Channel selection information 24 is passed to the decoder 10 for use in selecting which of the video data is to be displayed.

During an interactive programme such as a quiz, a question may be presented to a user through video or enhanced content displayed on the display unit. The configuration of the enhanced content can then give the user an opportunity to respond to the question. For this purpose the enhanced content, when decoded, will typically include a definition of the input criteria and an identifier for the question. The input criteria may include a set of available answers for a multiple choice question, or the definition of a field in which text data can be input. The identifier may be a numeric code which identifies which question it is, and includes data indicating the entity (e.g. analysing unit 6) to which responses should be sent.

When the question is decoded for display and sent to the display unit 5, the decoder 10 also sends to the message former 11 the identifier and timing information 22 as derived from the video stream 22.

If the user input 23 contains a response to a question, then a signal 25 from the user input unit 12 will be transferred to the message former 11. A message 26 will then be formed by the message former 11. The signal 25 will comprise data relating to the response, including the answer given by the user and, for instance, data relating to the receiver unit, or data relating to the time at which the response was entered by the user onto a user input device 4. Some or all of this information 25 will be incorporated into the message 26 formed by the message former 11. The message 26 will preferably also comprise timing data from the enhanced content signal which can identify the time at which the question was, for example, received, decoded or transmitted to the display unit 5. The message 26, once formed, will be transmitted from the receiver unit 3 to the network 2 and will then be analysed at the analysing unit 6 (shown in FIG. 2).

As indicated above, the timing information is derived from the video stream, for example from clock data of the video stream. For instance, high-level timing accuracy in enhanced television (ETV) applications can be achieved with the use of an algorithm which can query the Program Clock Reference (PCR) of an MPEG video stream. This PCR represents the master clock of an MPEG stream, and has a frequency of 27 MHz. It can thus provide a resolution of 0.037 µs. The PCR is added to the video stream at the point at which it is encoded in MPEG format.

Returning to the earlier example of a quiz application, at the precise time when a quiz question is presented, the PCR could be queried and the clock time stored by the ETV application. At the exact time when the user answers the question, the ETV application could again query the PCR, and could calculate the difference between the two PCR values. This information could then be transferred, together with the quiz answers, to the analyser unit 6, at which further processing could take place.

Figure 4:
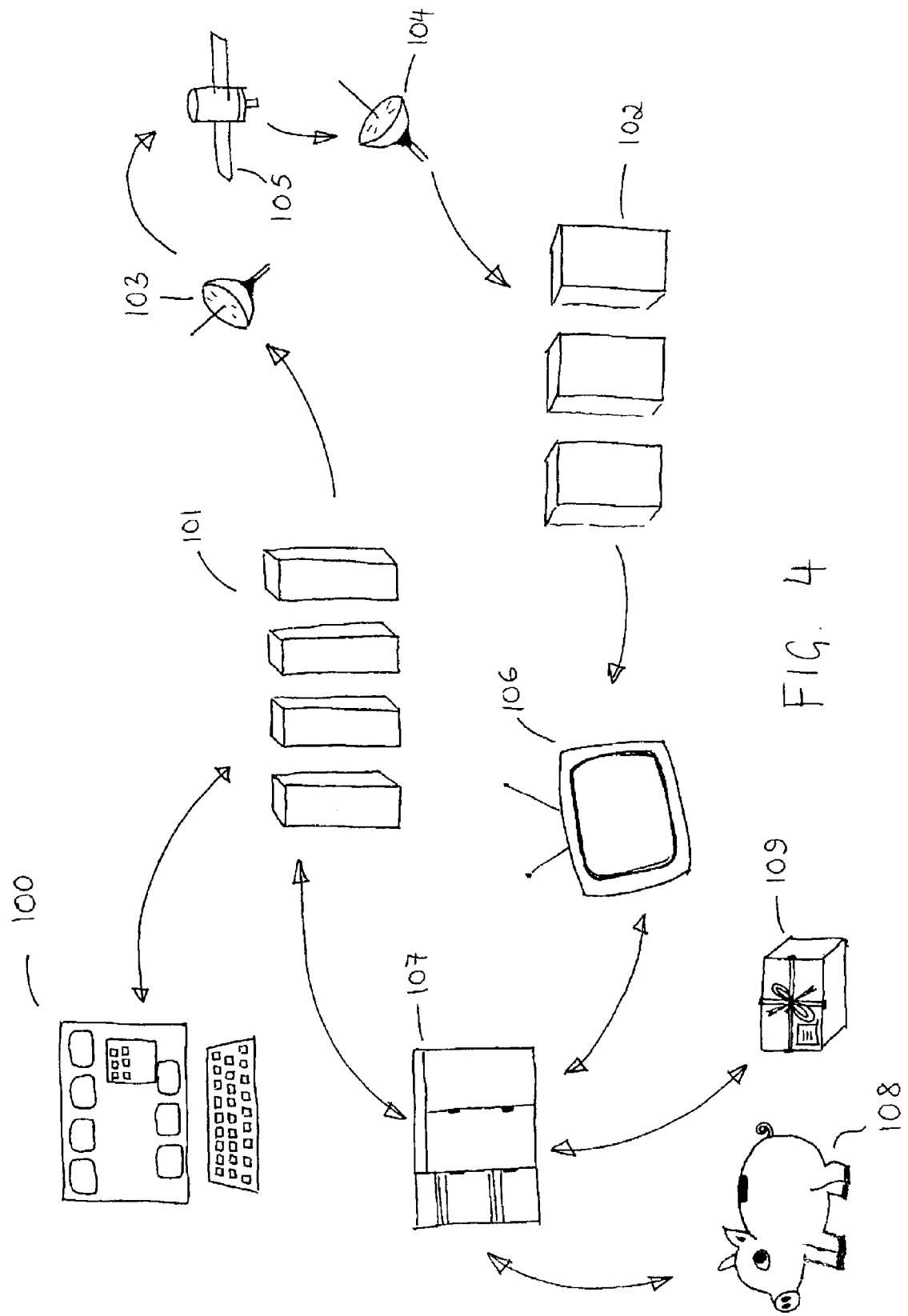
FIG. 4 shows an interactive television network.

FIG. 4 shows an example of a broadcast network in which the present system may be employed.

The network shown in FIG. 4 comprises an Edit Suite 100, a Playout Management Centre 101, a Media Control Manager 102, uplink and downlink stations 103 and 104, a satellite 105, a decoder 106, and a Transaction Management System 107. The decoder 106 may, for example, be a set-top box or a digital television. Each of the components of the system will be described in turn. The components can communicate with each other as indicated by the arrows in FIG. 4.

Interactive content is produced at the Edit Suite 100 (specifically, in a Content Production Manager (CPM)) on generic re-usable templates. The general templates can be manipulated by designers to produce a template with the desired format for a particular application. This specific template can then be saved to the memory of the CPM. Subsequent data can be added easily and quickly to the application-specific template, for example, daily news, weather or TV guides.

Once data has been added to a template at a CPM, the populated template is inputted to an Event Broker Console (EBC), the second stage of an Edit Suite, where it has a stream script added to it.

Meta-data is then added to the main broadcast stream (i.e. the video stream) that is associated with the content of the template. The meta-data allows the stream script to be triggered in real-time to synchronise the content with the main broadcast stream. For live television events, the EBC can be used to manage the broadcast of interactive pages, as will be described later.

Following production at the Edit Suite, the template data is passed to a Playout Management Centre (PMC) 101, which converts the data to a signal (representing pages of interactive content) in the relevant format for any platform on which it is to be received and displayed. The PMC can store the interactive content until it is needed. Once the interactive content is required, it is transmitted to a Media Control Manager (MCM) 102. To reach the MCM the interactive content could be sent to an uplink station 103 and transmitted via a satellite 105 to a downlink station 104 or could be sent in another way, for instance by cable.

The MCM 102 is located in a cable TV digital head end. The MCM receives interactive data from a PMC 101, stores it until it is to be played out, and, in response to receiving a trigger, broadcasts it to decoders 106. The decoders could be set-top boxes connected to televisions, or they could be digital televisions.

The MCM can be informed in a number of ways of when to cause a page of interactive content to be played out, by being transmitted from the MCM to the decoder 106, and subsequently displayed. For example, if the television event to which the interactive content is related is being broadcast live, then an editor at an Edit Suite 100 can manually trigger the play-out of the content from the MCMs 102. to ensure that the content is synchronised with an appropriate part of the television event. A trigger would be sent from the Edit Suite 100 to the PMC 101; the PMC would transcode the trigger and forward it to the MCM 102, and then the MCM would broadcast the trigger towards decoders 106. Alternatively, triggers can be arranged to be sent automatically at pre-determined times during a television event. In this case, the MCM has access to a time schedule and on the basis of this schedule, sends triggers to decoders at the times when it is desired for the interactive content to be played out. For instance, a TV programme might start at 7.30 pm, and triggers could then be sent automatically from the MCM 102 at 7.31 pm, 7.35 pm, 7.42 pm and so on, depending on the parts of the programme with which each page of interactive content is related. As another alternative, markers could be embedded in the video signal associated with a particular set of interactive pages, and triggers could be generated in dependence on the association between the markers and the pages. These markers would be the meta-data referred to above which is added to the video stream.

The MCM 102 can also manage the bandwidth allocated to video signals and interactive content signals according to television events taking place. Content can also be stored/buffered at the MCM.

A Transaction Management System (TMS) 107 is employed to deal with responses of subscribers to the interactive content broadcast. The TMS is capable of handling large numbers of concurrent responses, and can produce, for example, lists of winners of a competition following the subscriber responses. The TMS is linked to the PMC so that information related to subscriber responses can be fed back and inserted into broadcasts from the MCM 102. In addition, the PMC can communicate with the TMS.

For handling payments to action user responses the TMS is linked to a banking system 108. The TMS may send signals to other functions such as a third party fulfilment centre 109 so as to action user responses, for example to fulfil purchases or issue prizes.

Editors at the Edit Suites 100 can communicate with the TMS 107 via PMC 101 in order to determine how the TMS should react to responses sent from subscribers.

In the network of FIG. 4, the Playout Management Centre 101 may comprise the signal formatting apparatus 10 of FIG. 2.

In a system as described above with reference to FIG. 4, there would typically be multiple Edit Suites 100, one PMC 101, multiple MCMs 102 distributed geographically across an area served by the network, and one TMS 107, although in future it may be desirable in terms of efficiency to provide multiple PMCs and/or TMSs. Decoders 106 would be positioned locally to individual viewers, for example in their homes or in public buildings. The TMS 107 could be the analyser unit 6 of the present invention.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. A method for transmitting a message in an interactive television system, comprising:
   receiving at a receiver unit, from a video data provider, a live broadcast video stream;
   the live broadcast video stream including video data and a continuous timing stream indicative of timing of the video data, wherein the continuous timing stream has a frequency greater than 27 MHz;
   receiving at the receiver unit an instruction from a user to transmit a message from the receiver unit;
   in response to the instruction directly querying, from the continuous timing stream included in the live broadcast video stream, current timing data indicating a current time point in the video stream;
   in response to the instruction forming the message at the receiver unit;
   including in the message a timing indication based on the queried current time point and data identifying the receiver unit from which it was transmitted; and
   transmitting the message from the receiver unit.

2. A method according to claim 1 wherein the receiver unit is arranged to output the video data for display on an associated display unit.

3. A method according to claim 2 wherein the display unit is a television.

4. A method according to claim 1 wherein the video data is MPEG data.

5. A method according to claim 1 wherein the continuous timing stream is a Program Clock Reference.

6. A method according to claim 1 wherein the receiver unit is a set-top box.

7. A method according to claim 1 wherein the message is formed by an enhanced television application in the receiver unit.

8. A method according to claim 1 wherein the message includes data identifying the user of the receiver unit from which the message was transmitted.

9. A method according to claim 1 wherein the video stream includes enhanced content.

10. A method according to claim 9 wherein the enhanced content is a quiz program.

11. A method according to claim 1 wherein the message is transmitted to a server via a network to which the receiver unit is connected.

12. A method according to claim 1 wherein the message also includes data related to input of the user.

13. A method according to claim 1 wherein the video stream includes an image comprising an invitation to the user to send a message in response.

14. A method according to claim 13 wherein the receiver unit stores data from the timing stream at the time when the invitation is received at the receiver unit.

15. A method according to claim 14 wherein the said timing indication is a calculated difference between current timing data and the stored timing data.

16. A method according to claim 13 wherein a timer is started when the invitation is decoded at the receiver unit, and data from the timer is used to generate the timing indication.

17. A receiver unit for use in an interactive television system, the receiver unit comprising:
   a receiver arrangement for receiving, from a video data provider, a live broadcast video stream;
   the live broadcast video stream including video data and a continuous timing stream indicative of the timing of the video data wherein the continuous timing stream has a frequency greater than 27MHz;
   a receiver arrangement for receiving an instruction from a user to transmit a message from the receiver unit;
   a decoder for directly querying, from the continuous timing stream included in the live broadcast video stream, current timing data indicating a current time point in the video stream in response to the instruction;
   a message former for forming the message in response to the instruction;
   the formed message including a timing indication based on the queried current time point and data identifying the receiver unit from which it was transmitted; and
   a transmission arrangement for transmitting the message from the receiver unit.

18. A receiver unit according to claim 17 wherein the receiver unit is arranged to output the video data for display on an associated display unit.

19. A receiver unit according to claim 18 wherein the display unit is a television.

20. A receiver unit according to claim 17 wherein the video data is MPEG data.

21. A receiver unit according to claim 17 wherein the timing stream is a Program Clock Reference.

22. A receiver unit according to claim 17 wherein the receiver unit is a set-top box.

23. A receiver unit according to claim 17 wherein the message is formed by an enhanced television application in the receiver unit.

24. A receiver unit according to claim 17 wherein the message includes data identifying the user of the receiver unit.

25. A receiver unit according to claim 17 wherein the video stream includes enhanced content.

26. A receiver unit according to claim 25 wherein the enhanced content is a quiz program.

27. A receiver unit according to claim 17 wherein the video stream includes an image comprising an invitation to the user to send a message in response.

28. A receiver unit according to claim 27 wherein the receiver unit stores data from the timing stream at the time when the invitation is decoded at the receiver unit.

29. A receiver unit according to claim 28 wherein the said timing indication is a calculated difference between current timing data and the stored timing data.

30. A receiver unit according to claim 27 wherein a timer is started when the invitation is decoded at the receiver unit, and data from the timer is used to generate the timing indication.

31. A receiver unit according to claim 17 wherein the message is transmitted to a server via a network to which the receiver unit is connected.

32. A receiver unit according to claim 17 wherein the message also includes data related to input of the user.

33. A system for use in an interactive television network, the system comprising:
   a video transmitter for transmitting a video stream including video data and a timing stream indicative of the timing of the video data;
   a plurality of receiver units, at least one receiver arranged for receiving, from a video data provider, a live broadcast video stream;
   the live broadcast video stream including video data and a continuous timing stream indicative of the timing of the video data wherein the continuous timing stream has a frequency greater than 27 MHz;
   at least one receiver arranged for receiving an instruction from a user to transmit a message from the receiver unit;
   a decoder for directly querying, from the continuous timing stream included in the live broadcast video stream, current timing data indicating a current time point in the video stream in response to the instruction;

a message former for forming the message in response to the instruction; the formed message including a timing indication based on the queried current time point and data identifying the at least one receiver unit from which it was transmitted;

a transmission arrangement for transmitting the message from the at least one receiver unit for receiving the video stream and transmitting messages; and an analyser which analyses the messages transmitted by at least one of the receiver units.

34. A system according to claim 33 wherein the analyser can analyse the timing indication.

35. A system according to claim 33 wherein the analyser can analyse data within the message related to input of the user.

36. A system according to claim 35 wherein the analyser can identify a message which contains a particular response from the user to the invitation, and which has a timing indication corresponding to the earliest response from any user to the invitation, this user being the winner of a competition.

37. A system according to claim 36 wherein a routine is executed to provide the winner with a prize.

38. A method of performing an interactive television competition, the method comprising:

transmitting to a receivers; wherein the receiver is arranged for receiving, from a video data provider, a live broadcast video stream;

the live broadcast video stream including video data and a continuous timing stream indicative of the timing of the video data wherein the continuous timing stream has a frequency greater than 27 MHz;

the receiver arranged for receiving an instruction from a user to transmit a message from the receiver;

a decoder for directly querying, from the continuous timing stream included in the live broadcast video stream, current timing data indicating a current time point in the video stream in response to the instruction;

a message former for forming the message in response to the instruction;

the formed message including a timing indication based on the queried current time point and data identifying the receiver from which it was transmitted;

a transmission arrangement for transmitting the message from the receiver, an invitation to a user to submit a response by sending a message;

receiving a plurality of messages;

analysing the messages;

as a result of the analysis, identifying a winner; and providing the winner with a prize.

39. A method as claimed in claim 38, wherein the step of analysing the messages comprises determining which of the users submitted a response in the fastest time, and that user is identified as the winner.

40. A method as claimed in claim 38, wherein the step of analysing the messages comprises determining which of the users submitted a correct response in the fastest time, and that user is identified as the winner.

41. A method for transmitting a message in an interactive television system, comprising:

receiving at a receiver unit, from a video data provider, a live broadcast video stream;

the live broadcast video stream including video data and a continuous timing stream representing the timing of the video data wherein the continuous timing stream has a frequency greater than 27 MHz;

receiving at the receiver unit, from a user, an instruction to transmit a message from the receiver unit;

in response to the instruction, forming the message at the receiver unit;

including in the message a timing indication directly queried from the timing stream included in the live broadcast video stream in response to the instruction and data identifying the receiver unit from which it was transmitted, wherein the timing indication corresponds to a current time point in the video stream; and transmitting the message from the receiver unit.

42. The method of claim 41, wherein the timing indication comprises a value of the program clock reference.

\* \* \* \* \*